United States Patent
Dave et al.

(10) Patent No.: US 9,491,784 B2
(45) Date of Patent: Nov. 8, 2016

(54) STREAMING COMMON MEDIA CONTENT TO MULTIPLE DEVICES

(75) Inventors: Swapnil R. Dave, Santa Clara, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 92 days.

(21) Appl. No.: 13/563,215

(22) Filed: Jul. 31, 2012

(65) Prior Publication Data

US 2014/0040420 A1 Feb. 6, 2014

(51) Int. Cl.
*G06F 15/16* (2006.01)
*H04W 76/00* (2009.01)
*H04W 84/12* (2009.01)
*H04W 88/04* (2009.01)

(52) U.S. Cl.
CPC ........... *H04W 76/002* (2013.01); *H04W 84/12* (2013.01); *H04W 88/04* (2013.01)

(58) Field of Classification Search
USPC .......... 709/217, 220, 203; 707/661; 715/716
See application file for complete search history.

(56) References Cited

U.S. PATENT DOCUMENTS

| | | | |
|---|---|---|---|
| 7,263,293 B2 | 8/2007 | Ommodt et al. | |
| 7,573,816 B2 | 8/2009 | Gummalla et al. | |
| 7,876,766 B1 * | 1/2011 | Atkins et al. | 370/401 |
| 7,894,821 B2 | 2/2011 | Bai et al. | |
| 8,068,821 B2 | 11/2011 | Bhatia et al. | |
| 8,195,942 B2 * | 6/2012 | Zhang et al. | 713/170 |
| 8,255,457 B2 * | 8/2012 | Turner | H04L 67/1095 709/203 |
| 8,347,211 B1 * | 1/2013 | Rogers, III | G06Q 30/0601 715/716 |
| 8,402,049 B2 * | 3/2013 | Miyajima | G06F 17/30902 707/661 |
| 8,484,203 B1 * | 7/2013 | Clancy et al. | 707/723 |
| 8,503,991 B2 * | 8/2013 | Swift et al. | 455/414.1 |
| 8,571,061 B2 | 10/2013 | Zilberstein et al. | |
| 8,606,954 B1 * | 12/2013 | Abidogun et al. | 709/231 |
| 8,682,746 B2 * | 3/2014 | Verosub | G06F 17/30038 705/26.61 |
| 8,688,817 B2 | 4/2014 | Hartrick et al. | |
| 8,806,045 B2 * | 8/2014 | Turner | G06F 17/30132 709/231 |
| 8,959,176 B2 * | 2/2015 | Dave | H04L 12/5895 709/217 |
| 2003/0061294 A1 * | 3/2003 | Stennicke | 709/208 |
| 2005/0143136 A1 * | 6/2005 | Lev et al. | 455/566 |
| 2006/0095554 A1 | 5/2006 | Kuhles et al. | |
| 2007/0208715 A1 * | 9/2007 | Muehlbauer | 707/3 |
| 2007/0208763 A1 * | 9/2007 | Muehlbauer | |
| 2007/0217648 A1 * | 9/2007 | Muehlbauer | 382/100 |
| 2007/0220592 A1 * | 9/2007 | Muehlbauer | 726/4 |
| 2007/0234398 A1 * | 10/2007 | Muehlbauer | 725/145 |
| 2008/0242290 A1 | 10/2008 | Bhatia et al. | |
| 2009/0305680 A1 * | 12/2009 | Swift et al. | 455/414.1 |
| 2010/0273475 A1 | 10/2010 | Lee et al. | |
| 2011/0169913 A1 * | 7/2011 | Karaoguz et al. | 348/42 |
| 2011/0320626 A1 * | 12/2011 | Wong et al. | 709/231 |

(Continued)

*Primary Examiner* — Tammy Nguyen
(74) *Attorney, Agent, or Firm* — Meyertons Hood Kivlin Kowert & Goetzel, P.C.; Jeffrey C. Hood

(57) ABSTRACT

Systems and associated methods for providing a plurality of devices the same media content. A plurality of requests for media content may be received where each of the plurality of requests is received from a respective device. It may be determined whether the plurality of requests for media content are for the same media content. In response to determining that the plurality of requests are for the same media content, a single request for the media content may be generated. The media content may be received in response to the single request and the media content may be stored in a memory medium. The media content may be provided to each of the respective devices in response to the plurality of requests.

21 Claims, 6 Drawing Sheets

(56) References Cited

U.S. PATENT DOCUMENTS

| | | |
|---|---|---|
| 2012/0131622 A1 | 5/2012 | McDysan et al. |
| 2012/0140750 A1 | 6/2012 | Yan et al. |
| 2012/0310897 A1* | 12/2012 | Sato .............................. 707/687 |
| 2013/0124683 A1* | 5/2013 | Watanabe et al. ............ 709/217 |
| 2013/0287091 A1* | 10/2013 | Shaw et al. .............. 375/240.02 |
| 2013/0347037 A1* | 12/2013 | Soroushian ...................... 725/39 |
| 2014/0047376 A1* | 2/2014 | Hood ............................. 715/781 |
| 2014/0095592 A1 | 4/2014 | Hartrick et al. |

\* cited by examiner

STREAMING COMMON MEDIA CONTENT TO MULTIPLE DEVICES

FIELD

The present invention relates generally to wireless access points, and more particularly to improve performance of streaming media to multiple devices.

DESCRIPTION OF THE RELATED ART

On certain devices, such as laptop computers, desktop computers, tablets (e.g., iPad™, Android™-based tablets), video players, mobile gaming devices (e.g., Nintendo DS™, PlayStation Portable™, Gameboy Advance™, iPod™), various mobile devices (e.g., iPhone™, Android™-based phones), and certain television receivers (e.g., Apple TV™, Roku™) it is possible to view an event, a seminar, or a game, or attend a conference remotely. Media content streaming via "WiFi Streaming" or other analogous media content streaming allows multiple end users to view the same content using a variety of device platforms while remaining in different locations.

In certain instances, however, multiple devices may be streaming the same content from a single access point. For example, a concert or a sporting event, or even a live corporate event, may be streamed over the internet and multiple end users may attempt to access the streaming content from the same access point. In such instances, the end users often experience a degradation in the quality of the streaming content because buffering speeds are reduced. The buffering speeds are reduced due to the access point sending multiple requests for the streaming content in response to the multiple requests to the access point for the same streaming content. When the buffering speeds are reduced, the end user experiences a lag that leads to the degradation in the quality of the streaming content and can result in interruptions or delays in the delivery of the streaming content.

SUMMARY

Embodiments of the present invention relate to systems and associated methods for streaming common media content to multiple devices. In one embodiment, a plurality of requests for media content may be received, e.g., by an access point, where each of the plurality of requests is received from a respective device. The method may determine whether the plurality of requests for media content are for the same media content. According to an embodiment, determining whether the plurality of requests for media content are for the same media content may include determining that the IP address in each of the plurality of requests is the same. Alternatively, determining whether the plurality of requests for media content are for the same media content may include determining that the IP address in each of the plurality of requests is to a server hosting the media content.

In response to determining that the plurality of requests are for the same media content, a single request for the media content may be generated. The media content may be received in response to the single request and the media content may be stored in a memory medium. The media content may be provided to each of the respective devices in response to the plurality of requests.

According to an embodiment, the method may further include creating a plurality of local copies of the media content for each of the plurality of requests. In this embodiment, providing the media content to each of the respective devices may include providing the media content from a respective one of the local copies of the media content to each respective device.

According to an embodiment, the method described may be performed by an access point. The access point may include processor(s) which may execute program instructions for the access point. The processor(s) may also be coupled to a memory medium. The processor of the access point may be configured to implement part or all of the methods described herein, e.g., by executing program instructions stored on a memory medium. The access point may include at least one network port. According to an embodiment, the network port may be configured to couple to a wide are network and provide a plurality of devices with access to the wide area network. The network port may be a wired network port or alternatively may include an antenna for wireless access to the wide area network. The access point may include at least one antenna that may be configured to operate as a wireless local area network transceiver and may be further configured to communicate with a plurality of devices. According to an embodiment, the wireless local area network transceiver may be further configured to receive a plurality of requests for media content where each of the plurality of requests may be received from a respective device.

According to an embodiment, a UE device may communicate in a wireless manner with a wide area network. The UE device may communicate with a plurality of other UE devices that are in a local area network with the UE device. According to an embodiment, the local area network may include a Bluetooth local area network. The UE device may be further configured to operate as a personal wireless hotspot for the plurality of UE devices. A plurality of requests for media content may be received by the UE device where each of the plurality of requests is received from a respective UE device.

The UE device may perform the method described above. For example, the UE device may determine whether the plurality of requests for media content are for the same media content. Determining whether the plurality of requests for media content are for the same media content may include determining that the IP address in each of the plurality of requests is the same, or alternatively may involve determining that the IP address in each of the plurality of requests is to a server hosting the media content. In response to determining that the plurality of requests are for the same media content, the UE device may generate a single request for the media content. The UE device may receive the media content in response to the single request and the media content may be stored in a memory medium of the UE device. The UE device may provide the media content to each of the respective UE devices in response to the plurality of requests.

According to an embodiment, the method may further include the UE creating a plurality of local copies of the media content for each of the plurality of requests where providing the media content to each of the respective UE devices may include providing the media content from a respective one of the local copies of the media content to each respective UE device.

The UE device may include a processor(s) which may execute program instructions for the UE device. The processor(s) may also be coupled to a memory medium and/or to other circuits or devices, such as antennas. The processor(s) of the UE device may be configured to implement part or all of the methods described herein, e.g., by executing program instructions stored on a memory medium. The UE device may include at least one antenna for performing wireless communication with base stations. According to another embodiment, the local area network may include a Bluetooth local area network.

BRIEF DESCRIPTION OF THE DRAWINGS

A better understanding of the present embodiments can be obtained when the following detailed description of the preferred embodiment is considered in conjunction with the following drawings, in which.

Figure 1:
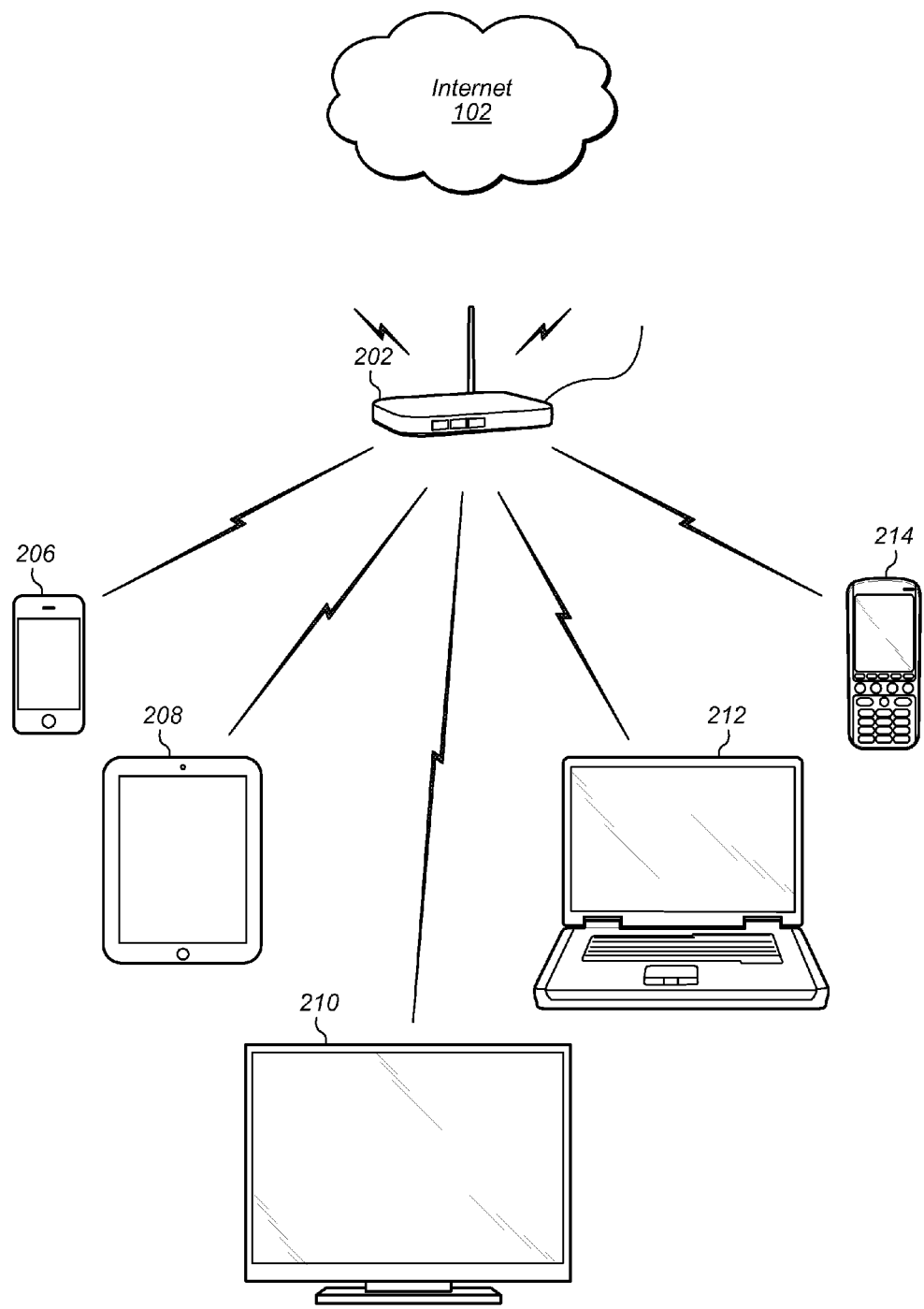
FIG. 1 illustrates an exemplary diagram of an access point communicating with various UE devices, according to one embodiment.

While embodiments described herein are susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the present embodiments as defined by the appended claims.

DETAILED DESCRIPTION OF THE EMBODIMENTS

Acronyms

The following acronyms are used in the present patent application.
RAT: Radio Access Technology
UE: User Equipment

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPod™), laptops, tablets (e.g., iPad™, Android™-based tablets), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system)

analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1

Exemplary Communication System

FIG. 1 illustrates an exemplary communication system. It is noted that the system of FIG. 1 is merely one example of a possible system, and embodiments of the invention may be implemented in any of various systems, as desired. Access point 202 may communicate wirelessly with wide area network, such as Internet 102. Additionally, the access point 202 may be configured to communicate with a plurality of devices. According to an embodiment, the plurality of devices may include UE devices, such as are illustrated by 206, 208, 212, and 214. Additionally, the access point 202 may be configured to communicate with other devices, such as illustrated by 210, according to an embodiment.

FIG. 2

Access Point

Figure 2:
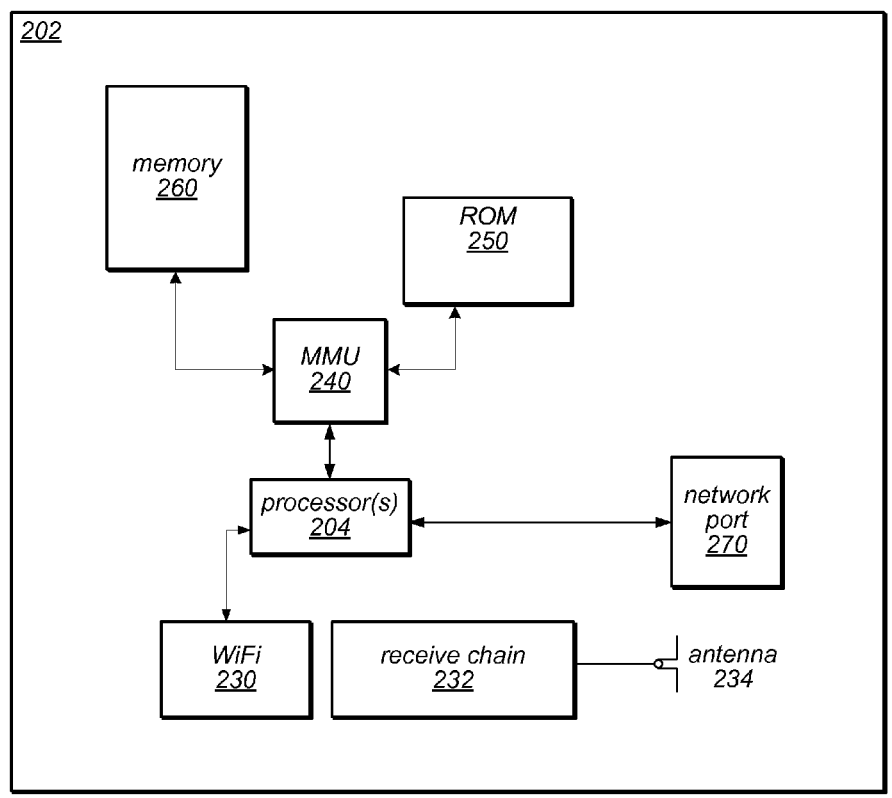
FIG. 2 illustrates an exemplary block diagram of an access point, according to one embodiment.

FIG. 2 illustrates an exemplary block diagram of an access point 202. It is noted that the access point of FIG. 2 is merely one example of a possible access point, and embodiments of the invention may be implemented in any of various devices, as desired. As shown, the access point 202 may include processor(s) 204 which may execute program instructions for the access point 202. The processor(s) 202 may also be coupled to memory management unit (MMU) 240, which may be configured to receive addresses from the processor(s) 202 and translate those addresses to locations in memory (e.g., memory 260 and read only memory (ROM) 250) or to other circuits or devices, such as WiFi 230, network port 270, and antenna 234. In some embodiments, the MMU 240 may be included as a portion of the processor(s) 202.

The access point 202 may include at least one network port 270. According to an embodiment, the network port 270 may be configured to couple to a wide area network and provide a plurality of devices, such as device 210 and UE devices 206, 208, 212, and 214 access to the internet 102 as described above in FIG. 1. According to an embodiment, the network port 270 may included an antenna for wireless access to the wide area network. In another embodiment, the network port 270 may be a wired network port.

The access point 202 may include at least one antenna 234. The at least one antenna 234 may be configured to operate as a wireless local area network transceiver and may be further configured to communicate with a plurality of devices such as 210 or UE devices 206, 208, 212, and 214 via WiFi 230. According to an embodiment, the wireless local area network transceiver 234 may be further configured to receive a plurality of requests for media content where each of the plurality of requests may be received from a respective device, such as those described above in FIG. 1.

The processor 204 of the access point 202 may be configured to implement part or all of the methods described herein, e.g., by executing program instructions stored on a memory medium (e.g., a non-transitory computer-readable memory medium). In other embodiments, processor 202 may be configured as programmable hardware element, such as an FPGA (Field Programmable Gate Array), or as an ASIC (Application Specific Integrated Circuit).

For example, in a particular embodiment, when the wireless area network transceiver receives a plurality of requests for media content from each of a plurality of respective devices the processor 204 may be configured to determine if the plurality of requests for media content are for the same media content. In response to determining that the plurality of requests are for the same media content, the processor 204 may generate a single request for the media content. When the media content in response to the single request is received, the processor 204 may store the received media content in the memory medium of the access point 202. The processor 204 may then provide the media content to each of the respective devices in response to the plurality of requests.

In various embodiments, the processor 204 may be further configured to determine that the IP address in each of the plurality of requests is the same to determine if the plurality of requests for media content are for the same media. Also, in another exemplary embodiment, the processor 204 may be further configured to determine that the IP address in each of the plurality of requests is to a server hosting the media content to determine if the plurality of requests for media content are for the same media.

In yet another embodiment, the processor 204 may be further configured to create a plurality of local copies of the media content for each of the plurality of requests. The processor 204 may then provide to each respective device the media content from one of the respective local copies of the media content.

FIG. 3

Flowchart Diagram: Access Point

Figure 3:
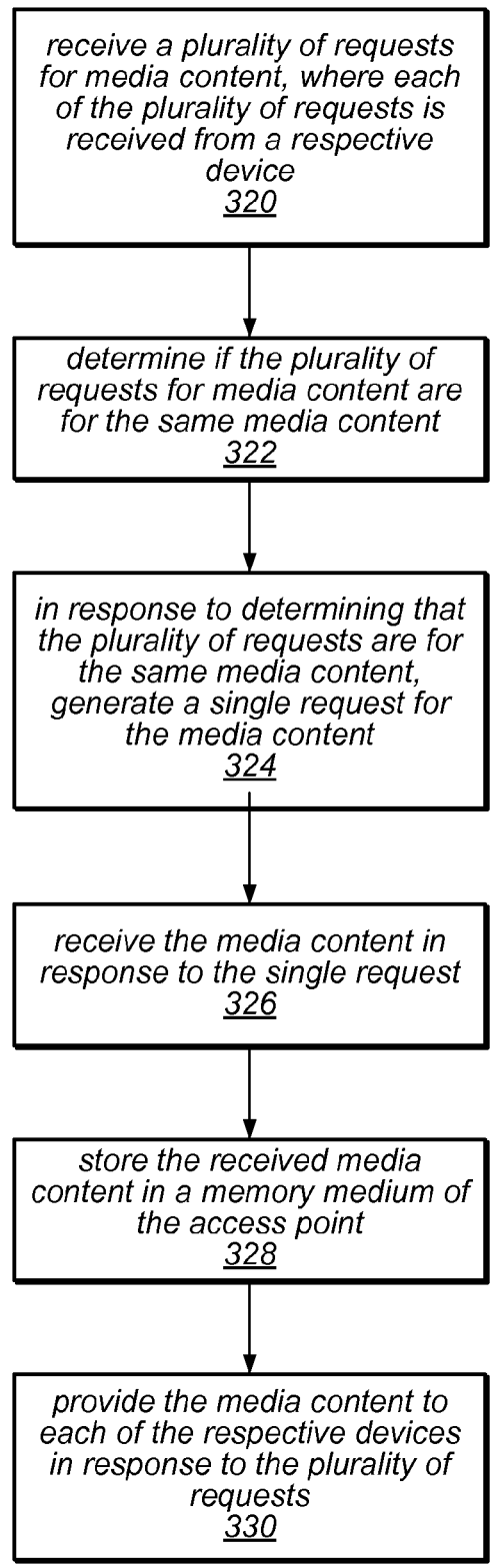
FIG. 3 is a flowchart of a method for streaming common media content to multiple UE devices, according to one embodiment.

FIG. 3 is a flowchart illustrating operation of one embodiment of the invention. The method shown in FIG. 3 may be performed by the access point 202, among other devices. In various embodiments, some of the method elements shown may be performed concurrently, in a different order than shown, or may be omitted. Note also that additional method elements may also be performed as desired.

In 320 a plurality of requests for media content may be received by the access point 202, where each of the plurality of requests is received from a respective device, such as the devices described above in FIG. 1. The media content may be streamed from the wide area network 102 via "WiFi Streaming" or other transmission or streaming methods. Additionally, the media content may be a live event such as seminar or conference, or the media content may be a variety of other content such as sports game, music concert.

In 322, the access point 202 may determine whether the plurality of requests for media content are for the same media content. According to an embodiment, determining whether the plurality of requests for media content are for the same media content may include determining that the IP address in each of the plurality of requests is the same. According to another embodiment, determining whether the plurality of requests for media content are for the same media content may include determining that the IP address in each of the plurality of requests is to a server hosting the media content.

In 324, in response to determining that the plurality of requests are for the same media content, the access point 202 may generate a single request for the media content to the wide area network 102.

In 326 the media content may be received by the access point 202 from the wide area network 102 in response to the single request and the media content may be stored in a memory medium in 328. In 330, the access point 202 may provide the media content to each of the respective devices in response to the plurality of requests.

According to an embodiment, the method may further include the access point 202 creating a plurality of local copies of the media content for each of the plurality of requests. In this embodiment, providing the media content to each of the respective devices may include providing the media content from a respective one of the local copies of the media content to each respective device.

FIG. 4

Exemplary Communication System

Figure 4:
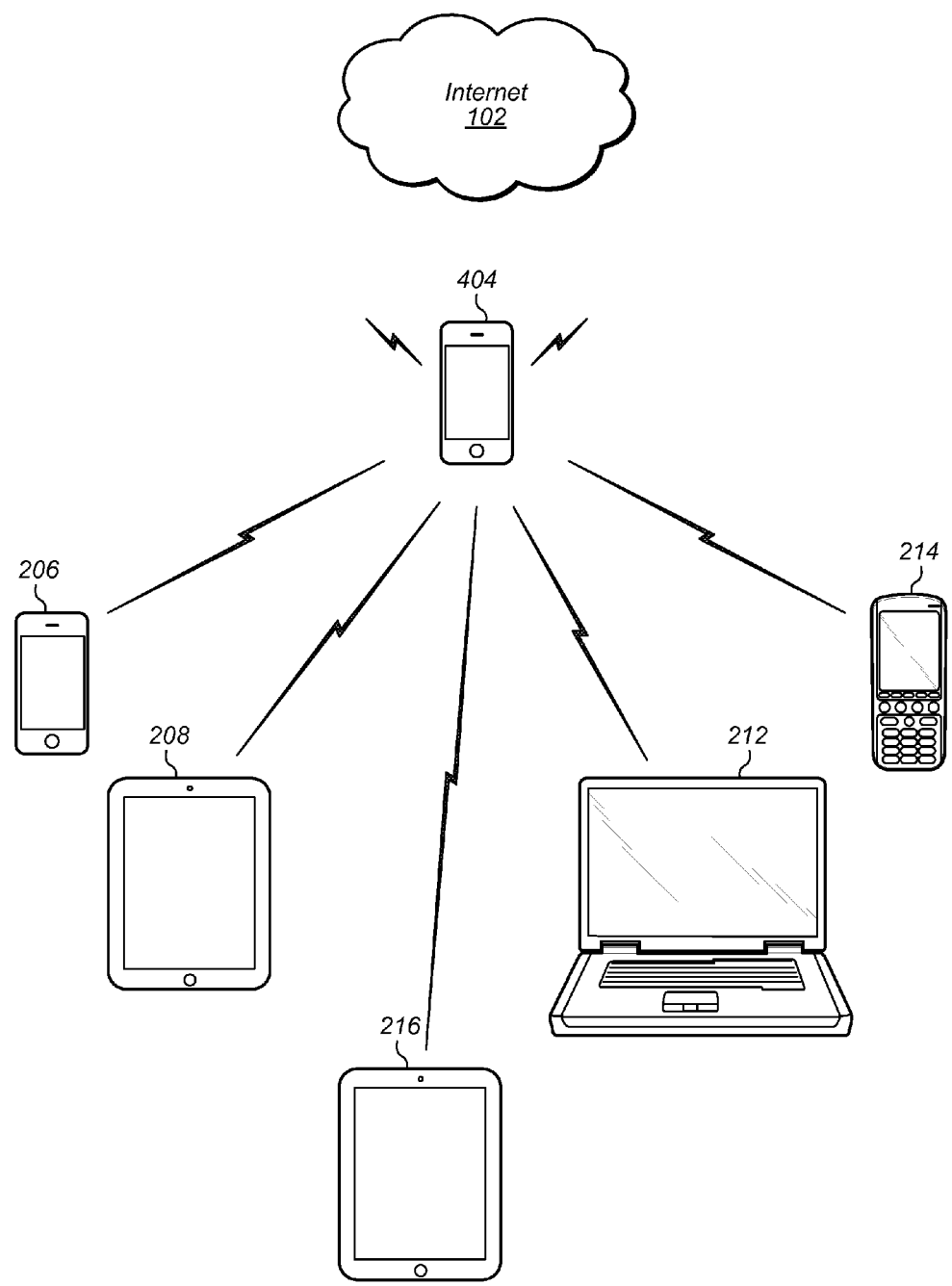
FIG. 4 illustrates an exemplary diagram of a UE device operating as a personal wireless hotspot for a plurality of UE devices, according to one embodiment.

FIG. 4 illustrates an exemplary communication system. It is noted that the system of FIG. 4 is merely one example of a possible system, and embodiments of the invention may be implemented in any of various systems, as desired. The UE device 404 may communicate wirelessly with a wide area network, such as the Internet 102. Additionally, the UE device 404 may be configured to communicate with a plurality of devices. According to an embodiment, the plurality of devices may include UE devices, such as are illustrated by 206, 208, 212, 214, and 216. Thus in the embodiment of FIG. 4 the UE device 404 may be configured to operate as a personal hotspot for other UE devices.

FIG. 5

UE Device

Figure 5:
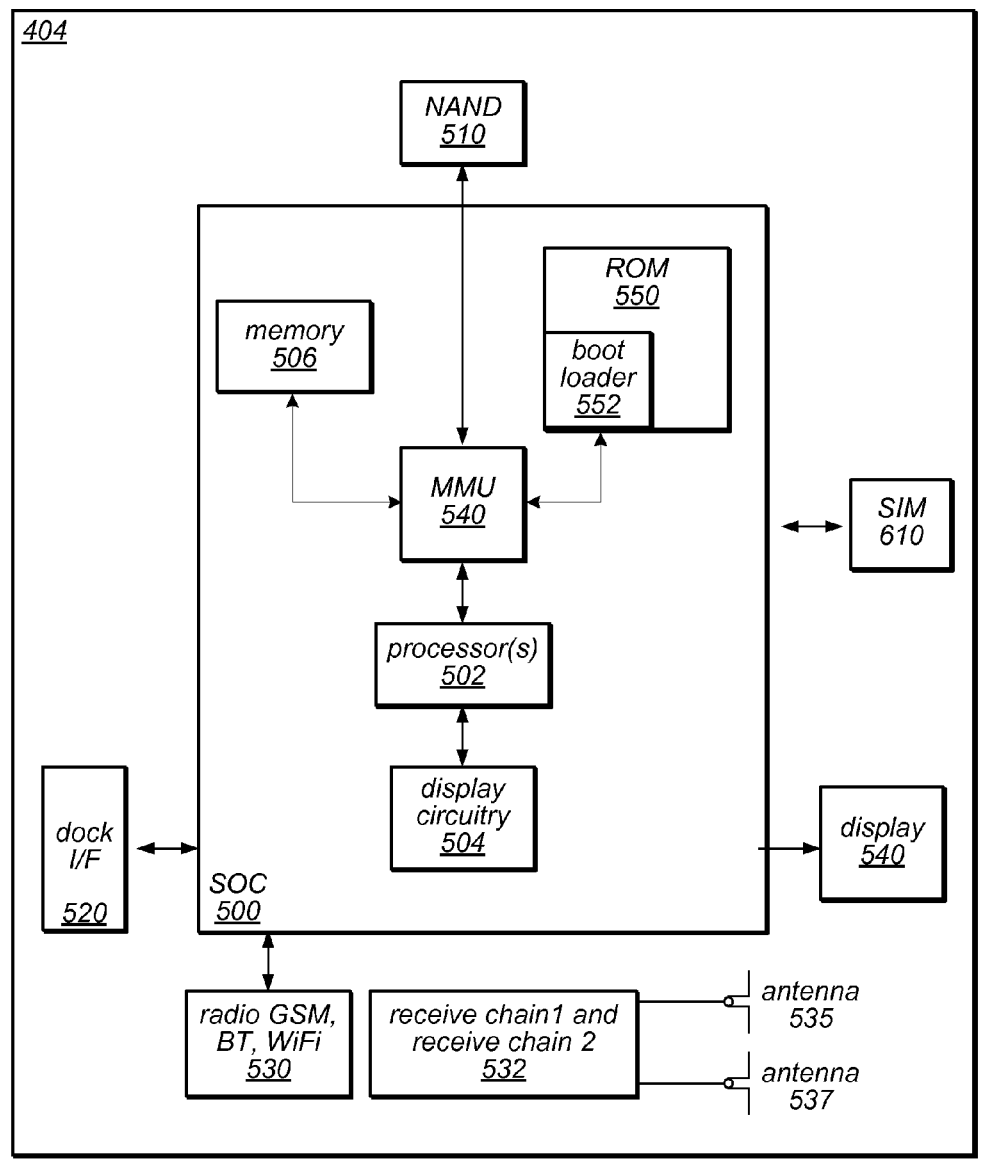
FIG. 5 illustrates an exemplary block diagram of a wireless UE device, according to one embodiment.

FIG. 5 illustrates an exemplary block diagram of a UE device 404. It is noted that the UE device of FIG. 5 is merely one example of a possible UE device, and embodiments of the invention may be implemented in any of various UE devices, as desired. As shown, the UE device 404 may include a system on chip (SOC) 500, which may include portions for various purposes. For example, as shown, the SOC 500 may include processor(s) 502 which may execute program instructions for the UE device 404 and display circuitry 504 which may perform graphics processing and provide display signals to the display 540. The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, radio 530, antennas 535 and 537, connector I/F 520, and/or display 540. In some embodiments, the MMU 540 may be included as a portion of the processor(s) 502.

In the embodiment shown, ROM 550 may include a bootloader 552, which may be executed by the processor(s) 502 during boot up or initialization. As also shown, the SOC 500 may be coupled to various other circuits of the UE device 404. For example, the UE device 404 may include various types of memory (e.g., including NAND flash 510), a connector interface 520 (e.g., for coupling to a computer system), the display 540, and wireless communication circuitry (e.g., for LTE, CDMA2000, Bluetooth, WiFi, etc.).

The UE device 404 may include at least one antenna, and in some embodiments multiple antennas, for performing wireless communication with base stations. For example, the UE device 404 may use antennas 535 and 537 to perform the wireless communication. According to an embodiment, one or more of the antennas 535 and 537 may be further configured to operate as a personal wireless hotspot for a plurality of UE devices as described above in FIG. 4. Thus the UE device 404 may be configured to communicate with a plurality of other UE devices that are in a local area network with the UE device 404. According to another embodiment, the local area network may include a Bluetooth local area network. As shown, the UE device 404 may include a SIM (Subscriber Identity Module) 610, which may also be referred to as a smart card. The SIM 610 may take the form of a removable SIM card.

Figure 6:
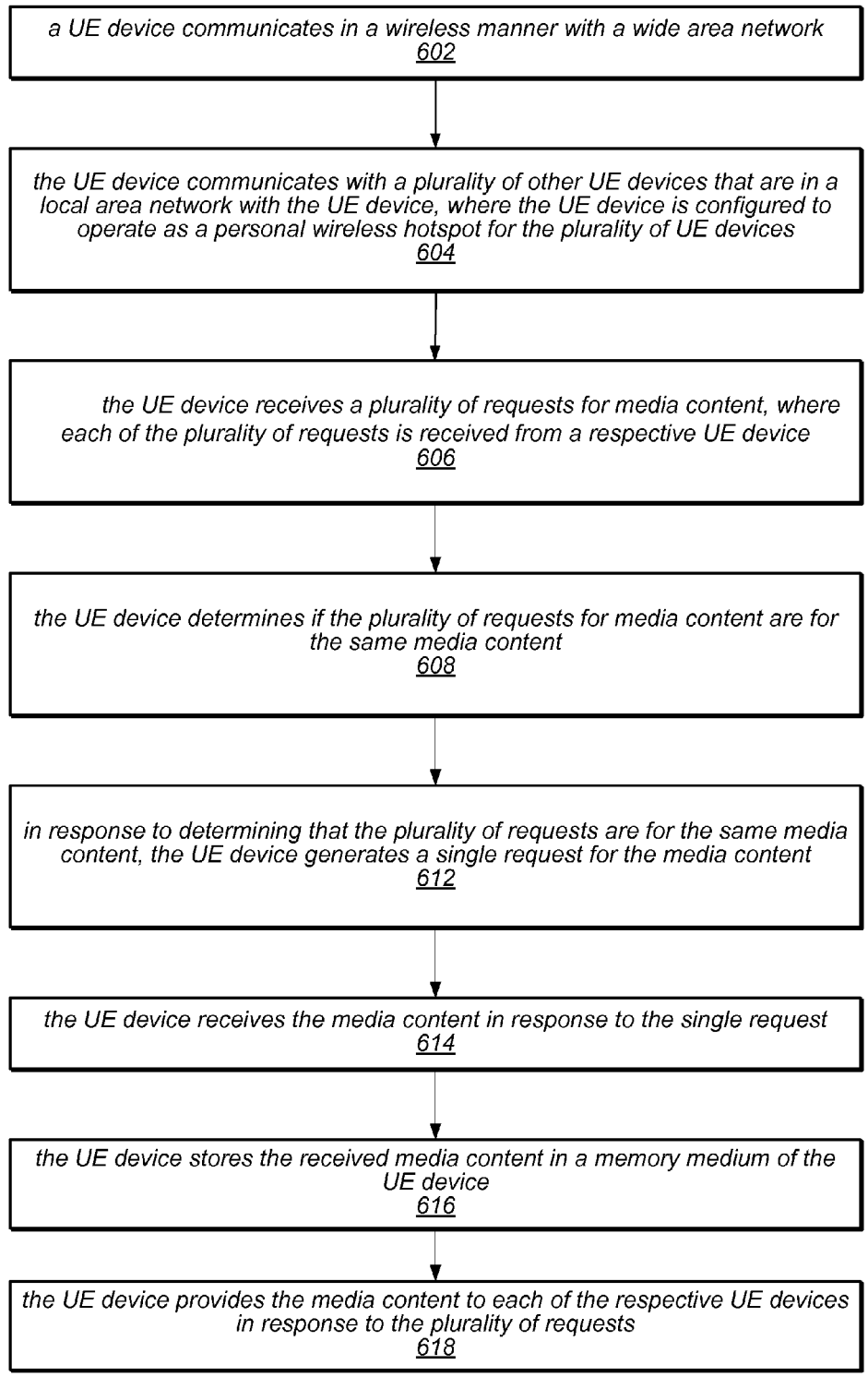
FIG. 6 is a flowchart of a method for streaming common media content to multiple UE devices using a personal wireless hotspot, according to one embodiment.

The processor 502 of the UE device 404 may be configured to implement part or all of the methods described in FIG. 6, e.g., by executing program instructions stored on a memory medium (e.g., a non-transitory computer-readable memory medium). In other embodiments, processor 502 may be configured as programmable hardware element, such as an FPGA (Field Programmable Gate Array), or as an ASIC (Application Specific Integrated Circuit).

For example, in a particular embodiment, when the UE device 404 receives a plurality of requests for media content from each of a plurality of respective UE devices the processor 502 may be configured to determine if the plurality of requests for media content are for the same media content. In response to determining that the plurality of requests are for the same media content, the processor 502 may generate a single request for the media content. When the media content in response to the single request is received, the processor 502 may store the received media content in the memory medium of the UE device 404. The processor 502 may then provide the media content to each of the respective devices in response to the plurality of requests.

In various embodiments, the processor 502 may be further configured to determine that the IP address in each of the plurality of requests is the same to determine if the plurality of requests for media content are for the same media. Alternatively, the processor 502 may be further configured to determine that the IP address in each of the plurality of requests is to a server hosting the media content to determine that the plurality of requests for media content are for the same media.

In yet another embodiment, the processor 502 may be further configured to create a plurality of local copies of the media content for each of the plurality of requests. The processor 502 may then provide to each respective UE device the media content from one of the respective local copies of the media content.

FIG. 6

Flowchart Diagram: UE Device

FIG. 6 is a flowchart illustrating operation of one embodiment of the invention. The method shown in FIG. 6 may be performed by a UE device 404, among other devices. In various embodiments, some of the method elements shown may be performed concurrently, in a different order than shown, or may be omitted. Note also that additional method elements may also be performed as desired.

In 602, UE device 404 may communicate in a wireless manner with wide area network 102.

In 604, the UE device 404 may communicate with a plurality of other UE devices that are in a local area network with the UE device. According to an embodiment, the local area network may include a Bluetooth local area network. The UE device may be further configured to operate as a personal wireless hotspot for the plurality of UE devices.

In 606 a plurality of requests for media content may be received by the UE device 404 in a wireless manner, where each of the plurality of requests is received from a respective UE device, such as the UE devices described above in FIG. 4. The media content may be streamed via "WiFi Streaming" or other analogous transmission or streaming formats. Additionally, the media content may be a live event such as seminar or conference, or the media content may be a variety of other content such as sports game, music concert.

In 608, the UE device 404 may determine whether the plurality of requests for media content are for the same media content. According to an embodiment, determining whether the plurality of requests for media content are for the same media content may include determining that the IP address in each of the plurality of requests is the same. According to another embodiment, determining whether the plurality of requests for media content are for the same media content may include determining that the IP address in each of the plurality of requests is to a server hosting the media content.

In 612, in response to determining that the plurality of requests are for the same media content, the UE device 404 may generate a single request to the wide area network 102 (or to an access point coupled to the wide area network 202) for the media content.

In 614 the UE device 404 may receive the media content from the wide area network 102 in response to the single request, and the media content may be stored in a memory medium of the UE device in 616.

In 618, the UE device 404 may provide the media content to each of the respective UE devices in response to the plurality of requests. The UE device 404 may provide the media content to the other UE devices in a wireless manner According to an embodiment, the method may further include the UE device 404 creating a plurality of local copies of the media content for each of the plurality of requests. In this embodiment, providing the media content to each of the respective UE devices may include the UE device 404 providing the media content from a respective one of the local copies of the media content to each respective UE device.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method, comprising:
by an access point which provides a wireless local area network for use by devices and which enables the devices to communicate through the access point to a wide area network:
generating a single request for first media content on the wide area network, wherein the single request is based on a plurality of requests received from respective devices on the wireless local area network, wherein each of the plurality of requests is for the first media content, wherein the single request for the first media content is generated on the wide area network instead of the plurality of requests for the first media content;
receiving, via the wide area network, the first media content in response to the single request;
storing the received first media content in a memory medium;
providing, from the memory medium, the first media content to each of the respective devices over the wireless local area network in response to the plurality of requests;
receiving, via the wireless local area network, at least one additional request for the first media content from at least one additional respective device subsequent to said generating the single request;
determining that the received at least one additional request is for the received first media content; and
providing, from the memory medium and responsive to the at least one additional request, the first media content to the at least one additional respective device over the wireless local area network without generating an additional request for the first media content over the wide area network.

2. The method of claim 1, further comprising:
determining if the plurality of requests for media content are for the same media content, wherein said determining if the plurality of requests are for the same media content comprises determining that an IP address in each of the plurality of requests is the same.

3. The method of claim 1, further comprising:
determining if the plurality of requests for media content are for the same media content, wherein said determining if the plurality of requests are for the same media content comprises determining that an IP address in each of the plurality of requests is to a server hosting the media content.

4. The method of claim 1, further comprising;
creating a plurality of local copies of the media content for each of the plurality of requests;
wherein said providing the media content comprises, for each respective device, providing the media content from a respective one of the local copies of the media content.

5. An access point, comprising:
a network port configured to couple to a wide area network;
a wireless local area network transceiver configured to communicate with a plurality of devices via a wireless local area network, wherein the wireless local area network enables the plurality of devices to communicate through the access point to the wide area network;
wherein the wireless local area network transceiver is configured to receive a plurality of requests for first media content, wherein each of the plurality of requests is received from a respective device of the plurality of devices on the wireless local area network;
a memory medium; and
a processor coupled to the memory medium, the network port and the wireless local area network transceiver, the processor configured to:
generate a single request for the first media content on the wide area network, wherein the single request is based on the plurality of requests received from the respective devices for the first media content, and where the single request for the first media content is generated on the wide area network instead of the plurality of requests for the first media content;
receive, via the network port coupled to the wide area network, the first media content in response to the single request;
store the received first media content in the memory medium of the access point; and
provide, from the memory medium and via the wireless local area network transceiver, the first media content to each of the respective devices in response to the plurality of requests;
receive, via the wireless local area network transceiver, at least one additional request for the first media content from at least one additional respective device subsequent to said generating the single request;
determine that the received at least one additional request is for the received first media content; and
provide, from the memory medium, via the wireless local area network transceiver, and responsive to the at least one additional request, the first media content to the at least one additional respective device without generating an additional request for the first media content over the wide area network.

6. The access point of claim 5,
wherein the network port comprises an antenna for wireless access to the wide area network.

7. The access point of claim 5,
wherein the network port is a wired networking port.

8. The access point of claim 5,
wherein the processor is further configured to determine that an IP address in each of the plurality of requests is the same to determine if the plurality of requests for media content are for the same media.

9. The access point of claim 5,
wherein the processor is further configured to determine that an IP address in each of the plurality of requests is to a server hosting the media content to determine if the plurality of requests for media content are for the same media.

10. The access point of claim 5,
wherein the processor is further configured to create a plurality of local copies of the media content for each of the plurality of requests;
wherein said providing the media content comprises, for each respective device, providing the media content from a respective one of the local copies of the media content.

11. A method, comprising:
a user equipment (UE) device communicating in a wireless manner with a wide area network;
the UE device communicating with a plurality of other UE devices that are in a local area network with the UE device, wherein the UE device is configured to operate as a personal wireless hotspot for the plurality of UE devices;
the UE device generating a single request for first media content on the wide area network, wherein the single request is based on a plurality of requests from respective UE devices of the plurality of UE devices for the first media content wherein the single request for the first media content is generated on the wide area network instead of the plurality of requests for the first media content;
the UE device receiving, over the wide area network, the first media content in response to the single request;
the UE device storing the received first media content in a memory medium of the UE device; and
the UE device providing, from the memory medium, the first media content to each of the respective UE devices in response to the plurality of requests;
the UE device receiving at least one additional request for the first media content from at least one additional respective UE device subsequent to said generating the single request;
the UE device determining that the received at least one additional request is for the received first media content; and
the UE device providing, from the memory medium and responsive to the at least one additional request, the first media content to the at least one additional respective device over the wireless local area network without generating an additional request for the media content over the wide area network.

12. The method of claim 11, further comprising:
the UE device determining if the plurality of requests for media content are for the same media content, wherein said determining if the plurality of request for the media content comprises the UE device determining that an IP address in each of the plurality of requests is the same.

13. The method of claim 11, further comprising:
the UE device determining if the plurality of requests for media content are for the same streaming media content, wherein said determining if the plurality of request for the media content comprises the UE device determining that an IP address in each of the plurality of requests is to a server hosting the media content.

14. The method of claim 11, further comprising:
the UE device creating a plurality of local copies of the media content for each of the plurality of requests;
wherein said providing the media content comprises, for each respective UE device, the UE device providing the media content from a respective one of the local copies of the media content.

15. The method of claim 11,
wherein the local area network comprises a Bluetooth local area network.

16. A user equipment (UE) device, the UE device comprising:
an antenna for communicating in a wireless manner with a wide area network;
wherein the antenna is further configured to communicate with a plurality of other UE devices that are in a local area network with the UE device;
wherein the UE device is configured to operate as a personal wireless hotspot for the plurality of UE devices;
a memory medium; and
a processor coupled to the memory medium and antenna, the processor configured to:
generate a single request for first media content on the wide area network, wherein the single request is based on a plurality of requests received from respective UE devices of the plurality of UE devices on the local area network, wherein each of the plurality of requests is for the first media content, wherein the single request for the first media content is generated on the wide are network instead of the plurality of requests for the first media content;
receive the first media content from the wide area network in response to the single request;
store the received first media content in the memory medium of the UE device; and
provide, from the memory medium, the first media content to each of the respective plurality of other UE devices over the local area network in response to the plurality of requests;
receive, via the local area network, at least one additional request for the first media content from at least one additional respective UE device subsequent to said generating the single request;
determine that the received at least one additional request is for the received first media content; and
provide, from the memory medium and responsive to the at least one additional request, the first media content to the at least one additional respective UE device over the local area network without generating an additional request for the first media content over the wide area network.

17. The UE device of claim 16,
wherein the processor is further configured to determine that an IP address in each of the plurality of requests is the same to determine if the plurality of requests for media content are for the same media.

18. The UE device of claim 16, wherein the processor is further configured to determine that an IP address in each of the plurality of requests is to a server hosting the media content to determine if the plurality of requests for media content are for the same media.

19. The UE device of claim 16, wherein the processor is further configured to create a plurality of local copies of the media content for each of the plurality of requests; wherein said providing the media content comprises, for each respective device, providing the media content from a respective one of the local copies of the media content.

20. The UE device of claim 16, wherein the local area network comprises a Bluetooth local area network.

21. The method of claim 1, further comprising: creating a plurality of local copies of the media content for each of the plurality of requests; wherein said providing the media content comprises, for each respective device, providing the media content from a respective one of the local copies of the media content.

* * * * *